Dec. 3, 1946.   P. D. ZOTTU   2,412,191
VOLTMETER
Filed March 31, 1944   4 Sheets-Sheet 1

INVENTOR.
PAUL D. ZOTTU
BY
Virgil E. Woodcock
Attorney.

Dec. 3, 1946.   P. D. ZOTTU   2,412,191
VOLTMETER
Filed March 31, 1944   4 Sheets-Sheet 3

INVENTOR.
PAUL D. ZOTTU.
BY Virgil E. Woodcock
Attorney.

Patented Dec. 3, 1946

2,412,191

UNITED STATES PATENT OFFICE 2,412,191

VOLTMETER

Paul D. Zottu, Indian Hills, Ky., assignor to The Girdler Corporation, Louisville, Ky., a corporation of Delaware Application March 31, 1944, Serial No. 528,941

6 Claims. (Cl. 171—95)

This invention relates to measuring instruments, more particularly to the measurement of voltages at high frequency, and has for an object the provision of a wide-range voltmeter of a simple, rugged construction and accurate throughout the wide range of voltages which it is capable of measuring.

In the development of high-frequency systems for application to manufacturing processes there has been need for a relatively simple means of measuring the voltages developed in the circuits. It has long been recognized that electrical energy at high frequency produces diathermy or internal heating of a wide variety of materials. These materials may vary from poor conductors to dielectrics or materials generally considered as non-conductors. For such a wide variety of applications, the voltage and frequency of the output circuit are adjusted to best suit a particular application.

In accordance with the present invention, a wide range voltmeter is provided, which is relatively accurate over a range of from 500 to 50,000 volts or more. From the circuit to be tested, a voltage is applied to two series-connected capacitors, one of which is adjustable between predetermined calibrated positions. For high voltages the adjustable capacitor preferably consists of an enlarged conductor forming one plate of the capacitor and a flat conductor forming the other plate of the capacitor. The flat plate is supported from a metallic housing having an opening above the flat plate. The enlarged or spherical conductor is movable along a path normal to the flat plate and to the opening in the housing. By increasing the spacing or air gap between the spherical conductor and the flat conductor, the voltmeter is set for operation to measure voltages between differing limits. This adjustment forms a multiplier for the voltmeter. For low voltages, the distance between the spherical conductor and the flat conductor is relatively short, while for a voltage near the maximum which is to be measured the distance is substantial. The second capacitor may be large in comparison with the one including the spherical conductor.

Inasmuch as the voltage divides across the capacitors inversely with their capacitance, only a fraction of the voltage to be measured appears across the larger capacitor. The fractional voltage which appears across the larger capacitor is applied to a rectifying device which produces an output current proportional to the applied high-frequency voltage. A current meter connected in the output circuit of the rectifier is calibrated in terms of the line voltage or the voltage to be measured. Hence, if the meter reads 500, the voltage measured will be either 500 or a fixed multiple thereof depending upon the setting of the spherical conductor.

For a more detailed explanation of the invention and for further objects and advantages thereof, reference is to be had to the following description, taken in conjunction with the accompanying drawings in which.

Figure 6:
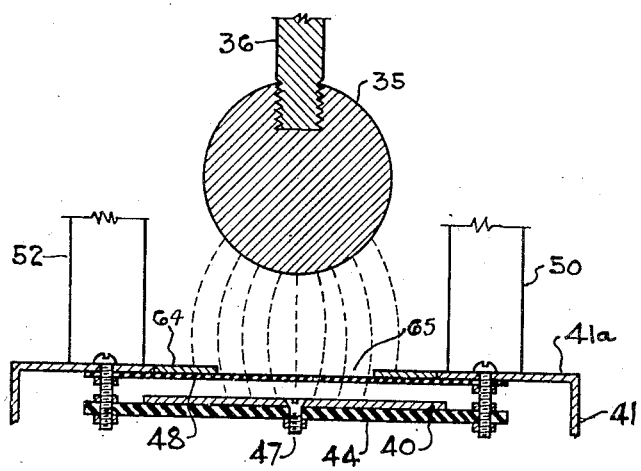
Figure 7:
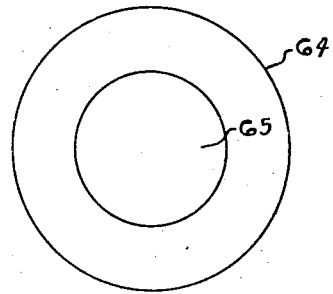

Fig. 6 diagrammatically illustrates a modified form of the invention;

Fig. 7 is a plan view of an iris disc shown in Fig. 6; and

Figure 8:
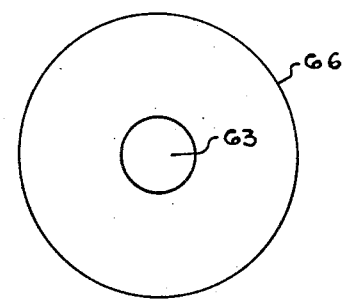

Fig. 8 is a plan view of a second iris disc having a smaller opening.

Figure 1:
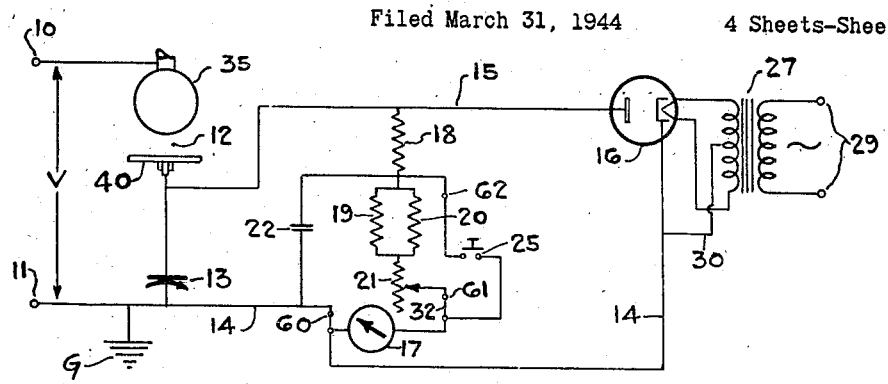
Fig. 1 is a wiring diagram, diagrammatically illustrating the relation of the parts and their associated circuits.

Referring to the drawings, a system embodying the invention will first be described, followed by a more detailed description of the structural features of the multiplying capacitor. In the system of Fig. 1, the invention is shown as comprising a high-voltage high-frequency voltmeter for the measurement of the voltage V appearing across the terminals 10 and 11. This voltage divides across two capacitors 12 and 13, connected in series between terminals 10 and 11. Both capacitors are adjustable. For a given setting the capacity of the capacitor 13 is usually much larger than that of the capacitor 12. In consequence, the voltage across the capacitor 13 is usually smaller than the voltage across the capacitor 12 for the reason that the voltage divides across the capacitors inversely with their capacitance. By making the capacitor 13 very large in comparison with the capacitor 12, the voltages applied to the measuring circuit may not only be of a reasonable order of magnitude, but entirely safe from an equipment and personnel standpoint.

The voltage appearing across the capacitor 13 is applied by conductors 14 and 15 to a rectifying device, preferably a diode 16. The rectified output from the diode is applied to a suitable indicating device, such, for example, as a milliammeter 17, having a scale preferably calibrated in volts. By means of the network comprising the series-connected resistors 18, 19, 20 and 21, and the capacitor 22, a substantially constant load is provided for the radiofrequency voltage which appears across the capacitor 13. The milliammeter 17 is connected in series with the resistor 21 which is variable or adjustable in order to provide an initial setting for the voltmeter which will read full-scale value for some convenient voltage across or between conductors 14 and 15.

By means of a normally open sensitivity switch 25, the resistors 19, 20 and 21 may be removed or bypassed from the circuit of the milliammeter 17. While the removal of these resistors greatly increases the reading and sensitivity of the meter 17 the load across the capacitor 13 remains substantially constant. This result is accomplished by the circuit including resistor 18 and the capacitor 22 whose reactance is relatively low as compared with the impedance offered by the resistors 19, 20 and 21 to the radiofrequency current. Hence, the inclusion or exclusion of the resistors 19—21 from the circuit does not materially change the load across the capacitor 13.

The diode 16 is provided with a filament transformer 27 whose primary is connected to a suitable source of alternating current supply 29. The midpoint of the secondary winding is connected by conductor 30 to the indirectly heated cathode of the diode 16. The direct current circuit for the meter 17, previously referred to, may be traced from the indirectly heated cathode by way of conductor 14, the meter 17, conductor 32, variable resistor 21, the resistors 19 and 20 connected in parallel with each other, the resistor 18 and by conductor 15 to the anode of the diode 16.

The initial calibration of the voltmeter is relatively simple. With the spherical conductor 35 comprising the upper high voltage plate or electrode of capacitor 12 in a position of approximately maximum spacing from a flat conductor 40 forming the other plate or electrode of the capacitor 12, the maximum voltage for which the meter is designed is applied. Thus, for a five inch spacing between the electrodes 35 and 40, a voltage of 50,000 volts may be applied between terminals 10 and 11. The frequency may be of any value within wide limits, for example, from some thousands of cycles per second to a hundred million cycles or more per second. With the aforesaid voltage of 50,000 (peak) volts at a frequency of say one million cycles per second, the capacitor 13 is adjusted until the pointer of meter 17 is deflected to its maximum or full-scale position. This may be accomplished by an R. F. voltage of the order of 100 volts across the capacitor 13. The capacitor 13 and the resistor 21 are now locked in their adjusted positions.

For all other voltage ranges, the capacitor 12 is adjusted by moving spherical conductor 35 to predetermined positions. Thus it is in effect a multiplier and fixes the range of voltages for the meter 17. If the meter is calibrated in volts from 0 to 500, then for the highest range the multiplying factor may be 100. By decreasing the spacing between the capacitor electrodes 35 and 40 by predetermined increments, other multiplying factors in steps of 10, from 1 to 100, may be provided. Once calibrated, the voltmeter as a whole continues effective as a satisfactorily accurate measuring device.

The importance of the sensitivity feature will be apparent by assuming the voltmeter is applied to the measurement of the output voltage of a high frequency oscillator or generator. During the starting up of such an oscillator, the load is to be gradually applied. Suitable adjustments of the circuit constants must be made to produce maximum output voltage. The problem is to determine whether a given change in capacitance or inductance is in the right direction to increase the output voltage. Small changes in the circuit constants frequently produce small changes in the output voltage. These may not be of sufficient magnitude to produce positive deflection of the meter 17. However, by temporarily closing the sensitivity switch 25 to exclude the resistors 19, 20 and 21, the sensitivity of the meter is materially increased. For each incremental change of voltage, the deflection of the meter is materially greater than with the sensitivity switch in its normally open position. Hence, whenever the voltage is low, the sensitivity switch 25 may be operated to by-pass the foregoing resistors and the resultant greater deflections will then indicate and clearly show the direction of the change in the output voltage.

In terms of operation, the operator can then ascertain with certainty the effect of changing the tuning, the circuit constants or other variables of the high frequency oscillator as it is brought up to full load operation. It may be observed again that operation of the sensitivity switch 25 does not materially change the load across the capacitor 13 since that load is largely established by the resistor 18 and the series capacitor 22, whose reactance is relatively low as compared with the impedance offered by the resistors 19—21.

Figure 5:
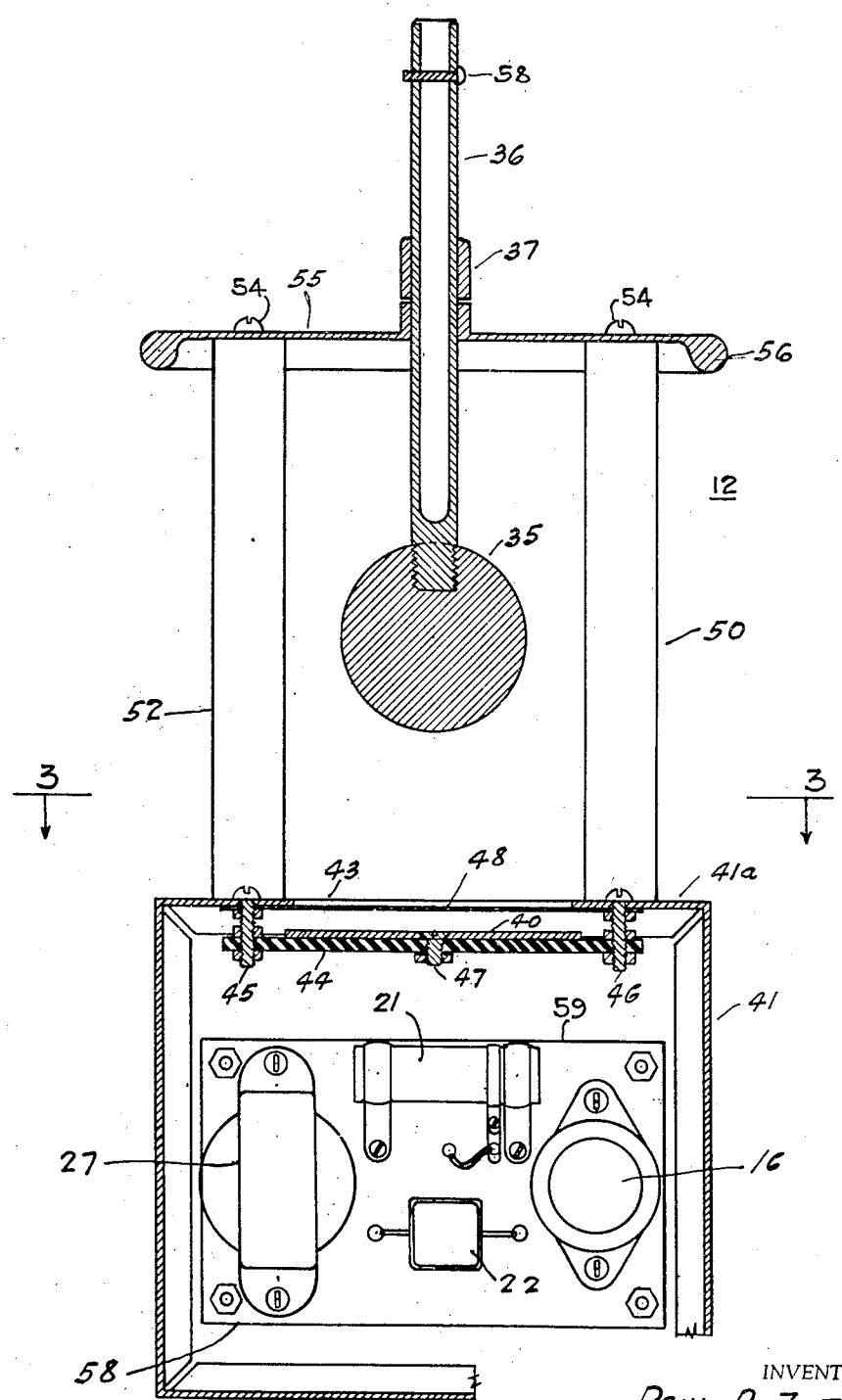
Fig. 5 is a fractional sectional elevation taken on the line 5—5 of Fig. 4.

Coming now to the structural features characterizing the invention, the capacitor 12 comprises the conductor or electrode 35 supported by a metallic stem 36 which is held in any desired position by means of a split-ring clamping device 37 provided with a clamping screw 38. The stem 36 as shown in Fig. 5 may be made of tubing with the lower end plugged, and threaded for threaded engagement with the electrode 35. As shown, the electrode 35 is spherical in shape and though this is the preferred construction, the invention is not limited thereto since other shapes may be used. For the higher voltages the electrode 35 should be provided with smooth or rounded edges to prevent corona discharge.

Figure 2:
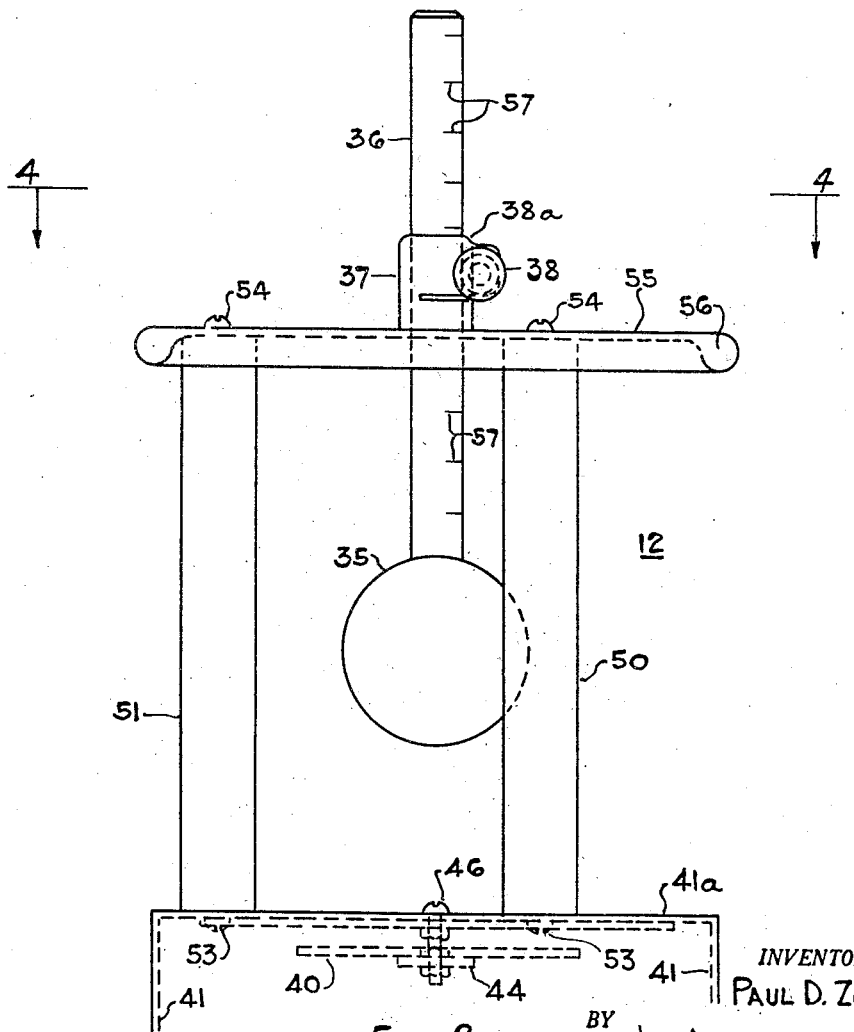
Fig. 2 is a fractional side elevation of the high voltage capacitor.
Figure 4:
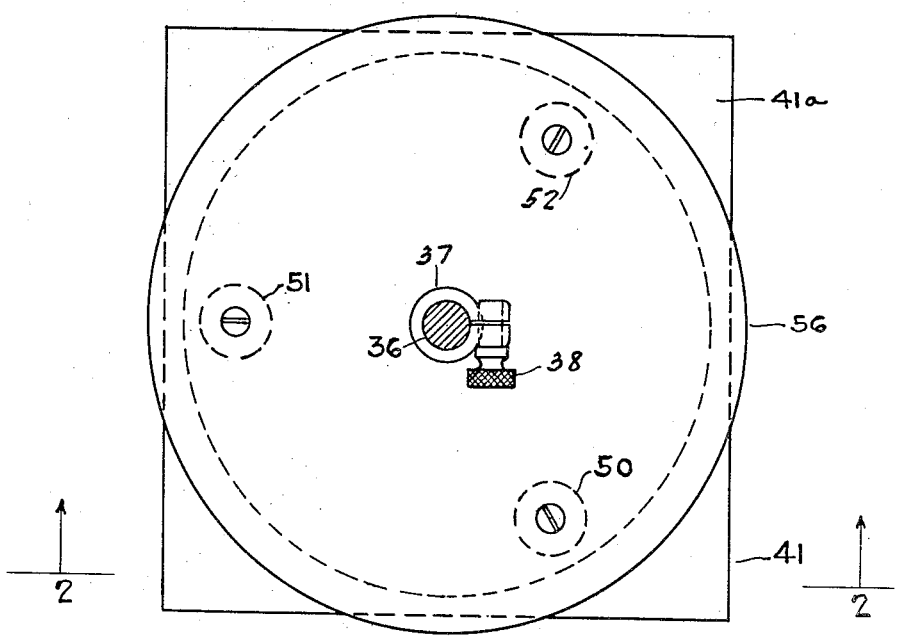
Fig. 4 is a sectional view taken on the line 4—4 of Fig. 2.
Figure 3:
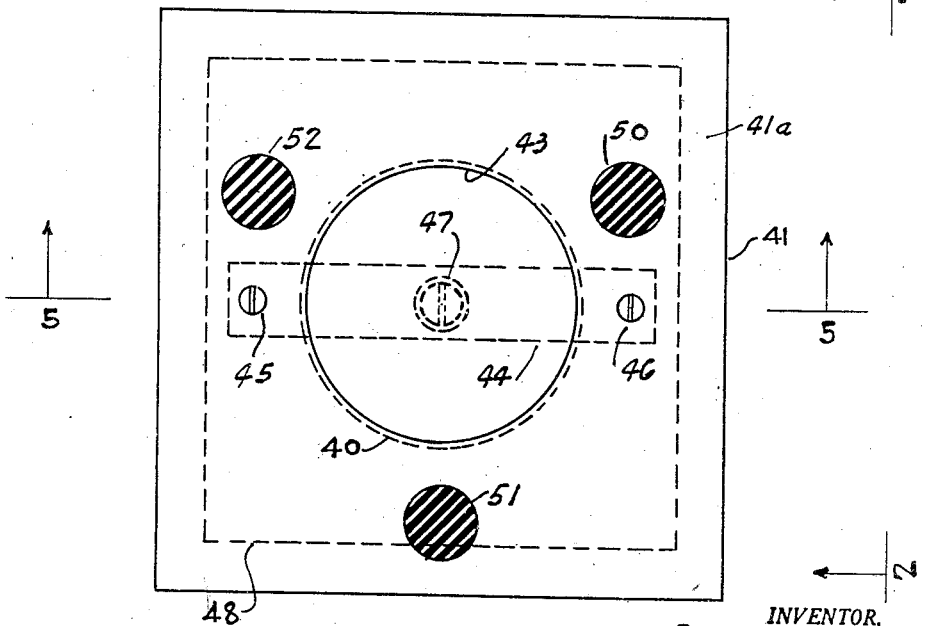
Fig. 3 is a sectional view taken on the line 3—3 of Fig. 5.

The cooperating capacitor electrode or plate 40 is shown in Fig. 3 to be circular although it can be of any desired configuration. Preferably it is supported, Figs. 2 and 5, below the upper wall 41a of a metallic housing 41 by means of an insulating supporting bar 44. This bar is carried between adjusting nuts at the ends of threaded screws 45 and 46 which extend downwardly through the upper wall or cover plate 41a of housing 41. The flat circular electrode 40 is fastened to the bar 44 by means of a threaded screw 47 and cooperating nut. The plate 40 is countersunk so that the head of screw 47 is flush with the upper surface thereof.

Just above the electrode 40 the central portion of the housing 41a is cut away to provide opening 43, shown as circular and of somewhat less diameter than that of the electrode 40. This opening is closed by means of an insulating closure member 48, held in place by means of additional nuts on the screws 45 and 46.

The movable electrode 35 is supported from the upper plate 41a of housing 41 by means of three insulators 50, 51 and 52, which may be of porcelain. The lower ends of the insulators, Fig. 2, have threaded openings to receive fastening screws 53 which extend through the housing plate 41a. The upper ends of the insulators also have threaded holes into which extend screws 54. These screws extend through the web 55 of a gradient ring 56. Mechanically the web of the gradient ring interlocks the insulators to provide a stable and rigid support for the electrode 35. Electrically the gradient ring 56 prevents undue rise in the voltage gradient at its supporting insulators. The spherical shape of electrode 35 is also important in this connection. Its shape or configuration is designed to maintain a low voltage gradient between it and plate 40.

The web 55 is also utilized to support the splitring clamping device 37. As shown, this may be made integral with the web 55 or welded thereto. Obviously it may be secured thereto as a separate unit by any suitable fastening means.

During the initial calibration of the voltmeter as a whole, graduations 57, Fig. 2, are marked on the stem 36. These may be marked with their multiplying values. For example, the graduation nearest the electrode 35 may be marked 100, the next 90 and so on down to 1. When the uppermost graduation is in alignment with the upper edge of the clamping device 37, the electrode 35 will be in its nearest position to the electrode 40. To prevent movement below this point, a stop member 58 shown only in Fig. 5, may be provided. This may be a headed pin or threaded screw inserted in a suitable hole provided in the supporting stem 36. By engagement of the stop member 58 with the clamping device 37, the lowermost position of electrode 35 is determined.

The housing 41, preferably of sheet metal, may be rectangular and deep enough to accommodate the electrical devices diagrammatically represented in Fig. 1. As shown in Fig. 5, a small panel 59 may carry on the exposed side thereof, the filament transformer 27, the capacitor 22, the variable resistor 21 and the diode 18. On the opposite side of the panel there may be mounted the other resistors 18, 19 and 20, and the variable capacitor 13.

The meter itself may be mounted in an opening (not shown) on a side wall of the housing 41 but the meter and the leads thereof are preferably carried to the control panel of the high frequency generator. This may be readily accomplished by a conventional plug and jack at the housing 41. The jack would be connected at the points marked 60 and 61 in Fig. 1. By utilizing a three-way plug and jack the sensitivity switch also may be remotely located. The third connection would be at the point in the circuit marked 62.

From the standpoint of safety, it is to be observed the lead from the meter 17 including the point 60 is connected directly to ground G. This connection in Fig. 5 is made through the meter case. In other words, both the meter case and the housing 41 operate at zero or ground potential. Because the sensitivity switch 25 is located in a circuit of higher voltage—although very low in comparison to that being measured—it is desirable to utilize a push-button switch having an insulating button by means of which it is operated.

With the foregoing understanding of the invention, many modifications thereof may suggest themselves. The voltmeter may be applied to widely differing service, both with respect to the voltage to be measured, and for widely varying frequencies. The meter may be carried by the housing 41 or remotely located. It may be used for control purposes as above described or as a simple measuring instrument.

The range of voltages which may be measured may be greatly extended without increasing the range of spacing between the electrodes 35 and 40. This is accomplished by reducing the electric field between the electrodes. Referring to Figs. 6 and 7, a metallic member 64 of copper or the like having an outside dimension equal to opening 43 is provided with an opening 65 of a predetermined size. The member 64 resting on the insulating closure 43 forms a shield which eliminates the outer portion of the electric field which in Figs. 2–5 would be effective. The shield or iris plate 64 is designed to make a good electrical contact with the upper wall 41a of the housing and hence places the iris plate at ground potential. If desired, binding posts and an interconnecting conductor may be utilized to establish this electric connection. Further to reduce the electric field a member 66, Fig. 8, with a still smaller opening 63 may be utilized.

The effect in each case is to decrease the electric field by a predetermined amount. Thus, the member 64 may multiply by five the range of voltage to be read, while the member 66 might multiply the range by 10. In this manner, the usefulness of the voltmeter is further extended. The various openings 43, 65 and 63 of different size are formed by iris-like discs which may themselves be replaced by a metallic iris such as used on photographic apparatus. A typical iris shutter of a camera will provide an infinite number of adjustments although predetermined changes are to be preferred. If desired, the electrode 40 of Fig. 1 may also be placed above the box and above side 41a.

If desired, the iris member may be of one piece with several openings of predetermined size therein. This member may be mounted for slidable movement along the housing top 41a to bring the desired opening in registery, concentric with the line of travel of electrode 35.

It is to be understood the foregoing examples of multiplying factors and calibration values are suggestive. The meter 17 may be provided with any suitable scale. Its reading for any given setting of the electrode 35 may then be converted by a suitable graph or table into terms of line voltage applied between terminals 10 and 11.

While embodiments of the invention have been described, it will be understood that further modifications may be made without departing from the spirit and scope of the invention as set forth in the appended claims.

What is claimed is:

1. The combination, with a high-voltage high-frequency measuring device of the type in which a rectified current varies in accordance with the voltage to be measured, of a plate having an opening therein, a high-voltage capacitor comprising two electrodes, means for supporting a first of said electrodes on one side of said plate in spaced relation therewith and electrically insulated therefrom, said first electrode being larger than said opening, the second electrode of said capacitor being spherical, means supporting said spherical electrode in spaced relation with the other side of said plate and with said first electrode, said supporting means providing for the adjustment of the position of said spherical electrode with respect to said first electrode thereby to change the voltage range of the device.

2. The combination, with a high-voltage measuring device in which a rectified current varies in accordance with the voltage to be measured, of a metal plate having an opening extending through the mid-portion thereof, a capacitor including at least a first electrode and a second electrode, electrical insulating means for supporting said first electrode in spaced relation with said opening and concentrically thereof, a plurality of insulating supports secured to said plate and extending outwardly therefrom, means including a clamping device carried by the outer ends of said insulating members, said second electrode including a supporting stem adapted to be held by said clamping device, whereby said last-named electrode may be supported in different predetermined positions with respect to said first electrode.

3. In a high-voltage high-frequency measuring device in which a rectified current varies in accordance with the voltage to be measured, the combination of a pair of series-connected capacitors across which the voltage divides inversely with respect to their capacities, a circuit connected across the larger of said capacities and including a rectifying device for producing said rectified current, a network connected in parallel with said larger capacitor for producing a substantially constant load across said larger capacitor, said network including a resistor and a third capacitor connected in series with each other and in shunt across said large capacitor, said network also including at least one additional resistor, and means for increasing the magnitude of said rectified current without substantially changing the load across said larger capacitor comprising a switch for removing said last-named resistor from said circuit.

4. The combination, with a high-voltage high-frequency measuring device in which a rectified current varies in accordance with the voltage to be measured, of a high-voltage capacitor which comprises electrodes relatively movable to different positions with respect to each other to change the capacity between them and the range of voltage to be measured, and shielding means interposed between said two electrodes having an opening therein for the passage therethrough of a part only of the electrostatic field which would otherwise extend between said two electrodes.

5. The combination, with a high-voltage high-frequency measuring device of the type in which a rectified current varies in accordance with the voltage to be measured, of a series-circuit including two capacitors one of which is relatively large with respect to the other, said smaller capacitor being characterized by the provision of two electrodes one of which is movable relative to the other, means including one of said electrodes for applying to said series-circuit the voltage to be measured, means for holding one of said electrodes in different predetermined positions with respect to the other to predetermine the capacity therebetween and thereby fix the voltage range of the measuring device, and adjusting shielding means interposed between said electrodes for predetermining the proportion of the electric field which may then exist between said electrodes further to change the voltage range of the measuring device.

6. The combination, with a high-voltage measuring device in which a rectified current varies in accordance with the voltage to be measured, of a metal plate having an opening extending through the mid-portion thereof, a capacitor including at least a first electrode and a second electrode, electrical insulating means for supporting said first electrode in spaced relation with said opening, a plurality of insulating supports secured to said plate and extending outwardly therefrom, means including a clamping device carried by the outer ends of said insulating members, said second electrode including a supporting stem adapted to be held by said clamping device, whereby said last-named electrode may be supported in different predetermined positions with respect to said first electrode.

PAUL D. ZOTTU.